Figure 1:
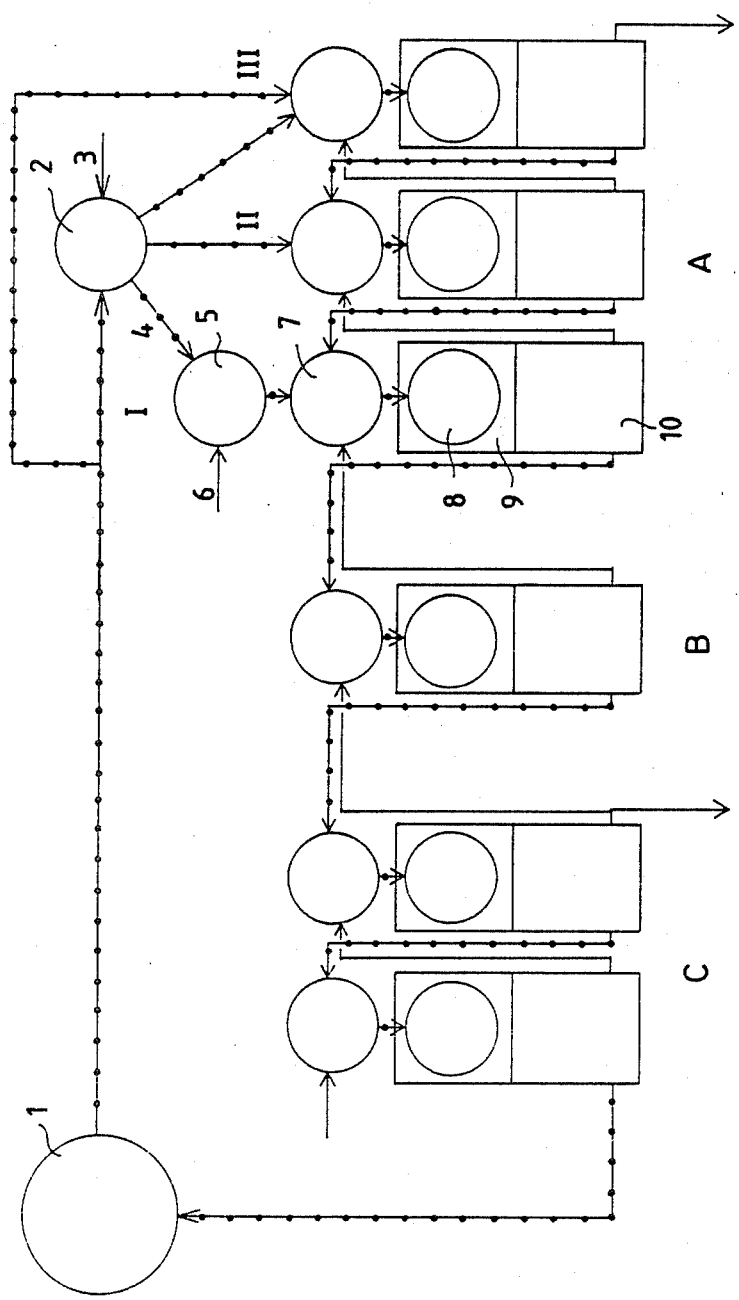

United States Patent [19]

Nyman et al.

[11] Patent Number: 4,786,187
[45] Date of Patent: Nov. 22, 1988

[54] METHOD FOR DISPERSING TWO PHASES IN EXTRACTION AND APPARATUS FOR REALIZING THE METHOD

[75] Inventors: Bror G. Nyman, Ulvila; Stig-Erik Hultholm, Pori; Launo L. Lilja, Pori; Valto J. Mäkitalo, Pori all of Finland

[73] Assignee: Outokumpu Oy, Helsinki, Finland

[21] Appl. No.: 930,728

[22] Filed: Nov. 13, 1986

[30] Foreign Application Priority Data

Nov. 28, 1985 [FI] Finland .................................. 854726

[51] Int. Cl.$^4$ ................................................ B01F 3/08
[52] U.S. Cl. .................................... 366/265; 366/136; 366/348
[58] Field of Search .................................. 366/262–264, 366/255, 279, 136, 137, 154, 165, 267, 265; 422/227, 225, 228, 259, 258

[56] References Cited

U.S. PATENT DOCUMENTS

| | | | |
|---|---|---|---|
| 2,180,301 | 11/1939 | Saylor .................................. | 366/265 |
| 2,713,028 | 7/1955 | Jenks .................................. | 366/159 X |
| 3,973,759 | 8/1976 | Mizrahi et al. ...................... | 366/264 |
| 4,203,956 | 5/1980 | Schroter et al. ................. | 422/228 X |
| 4,235,602 | 11/1980 | Meyer et al. .................. | 422/228 X |
| 4,357,110 | 11/1982 | Hope et al. ...................... | 366/262 X |
| 4,358,206 | 11/1982 | Schutte .............................. | 366/262 |
| 4,551,314 | 11/1985 | Beckstead et al. ........... | 423/658.5 X |
| 4,628,391 | 12/1986 | Nyman et al. ...................... | 366/265 |

Primary Examiner—Stuart S. Levy
Assistant Examiner—Lynn M. Sohacki
Attorney, Agent, or Firm—Brooks Haidt Haffner & Delahunty

[57] ABSTRACT

The invention is related to a method for dispersing two phases in an extraction process so that each extraction step includes several mixing stages, and at each mixing stage the mixing is carried out by means of a vertical circulation and advantageously at least one mixing stage is provided with an intensified vertical circulation. According to the invention, the dispersing apparatus of one extraction step in an extraction process is formed of several mixers provided with circulation cylinders (11). Advantageously at least one of the mixers is provided with a dispersing pump (16).

15 Claims, 4 Drawing Sheets

METHOD FOR DISPERSING TWO PHASES IN EXTRACTION AND APPARATUS FOR REALIZING THE METHOD

The present invention relates to a method for dispersing two phases in extraction so that one extraction step contains several mixing stages. In at least one stage the dispersing is advantageously carried out by means of intensified vertical circulation. According to the invention, the dispersing equipment of one extraction step comprises several mixers provided with circulation cylinders.

So far the prior art extraction processes and equipment have been characterized by the fact that one extraction step is formed by a mixer, a settler and possibly a presettler placed in between these two. To achieve a good dispersion with low stirrer speed is often difficult in terms of only one mixing stage. On the other hand, an increase in the stirrer speed may cause emulsification. If the drops created at the mixing stage are very small in size, there is needed a large settling zone in order to clarify the solutions, or—in case the mixing is incomplete—it is necessary to have several extraction steps in order to achieve clear solutions.

According to the present invention, a good dispersion of two phases in an extraction process is achieved by installing several mixers in series within one extraction step. Now the great shearing forces caused by high stirrer speeds can be avoided. Moreover, by employing several mixers coupled in series, it is possible to create a dispersion which is formed of large drops and thus easily separated, in which case the settler volume can be decreased. It has also been proved that the number of extraction steps can be limited by using serial mixers, and this means considerable savings in the expenses. The serial mixer arrangement is advantageous also if the system in question is based on slow extraction reactions, and if the amount of the matter to be extracted is large, and requires neutralizing additions directly into the mixer.

Nowadays the advantages of dispersion in serial mixers can be largely availed of, because there are obtainable extractants with an extraction capacity remarkably sharper than before. Particularly when extracting large mass quantities from concentrated solutions, it is possible, by employing the method of the present invention, to use concurrent sections at the mixing stage and still succeed in separating the desired solution component with a sufficient degree of purity. In conventional extraction techniques, a countercurrent coupling is used in the extraction steps.

When employing the method of the present invention, it is also advantageous that in each mixing chamber the dispersing is based on the vertical circulation of the dispersion, in which case the mixing member is located in the middle part of the mixing chamber, or above it. Furthermore it is preferable,,in order to achieve a good dispersion output, that at least within one mixing chamber there is created an intensified vertical circulation of the dispersion, resembling a double loop in form, and that within the same mixing chamber, by employing a dispersion pump connected to the axis of the mixing member, the dispersion can be raised above the level of the liquid surface in the mixing chamber. Now it is also advantageous to adjust the return conduits of the light and heavy phases from the settler part of the same step to proceed into the mixing chamber provided with intensified vertical circulation.

In the particular mixing chamber where intensified mixing is desired, the mixing member is placed in the middle of the mixing chamber, or above it, and the dispersion of the phases fed into the mixing chamber through the circulation cylinder is improved by directing the turbine jet upwards. The dispersion flows from the top between the turbine jets downwards, turns at the bottom of the mixing chamber and rises, via the separate middle part of the mixing chamber, up to below the mixing member. Thus the proceeding prospects of the extraction reactions, i.e. the extraction step efficiency, are improved by lengthening the flow circulation, which now more or less assumes the form of a double-loop circulation resembling the character eight. Owing to the clear flow pattern thus created, the stirrer speed can be decreased even lower, which in turn decreases the possibilities of emulsification.

In the mixing chamber where the intensified vertical circulation takes place, it has also been possible to eliminate some of the solution flow limitations between separate extraction steps by conducting the said dispersion, formed of the extraction phases by means of flow circulation, to above the mixing member, divided at least into two separate sub-flows starting from the middle of the mixing chamber, up to a level essentially higher than the surface of the liquid contained in the mixing chamber. When carried out according to the specification of the present application, the raising of the dispersion does not lead to emulsification—on the contrary, it has been observed that a partial classification of the phases takes place simultaneously as the sub-flows are made to rise higher. While the sub-flows ascend, they are also made to rotate at the same speed as the stirrer itself When the desired height is achieved, the dispersion rising in sub-flows is made to change direction so as to be tangential with respect to the rotation, in which case the sub-flows burst out in a symmetrical ring, where the centrifugal force causes partial classification of the phases. Now the sub-flows partly collide, and at the same time their flow speed is decreased. From the circle-shaped flow the dispersion is made to proceed, as flexibly as possible, into the space located below and outside of the ring, which space as a whole is still located above the level of the liquid surface in the mixing chamber, and from there the dispersion is conducted into the next stage. As was already said before, it is essential, as regards the raising of the dispersion, that the dispersion be treated gently, so that the danger of emulsification does not arise. In this method it is not necessary, in order to disperse phases, to use a high mixing intensity, because a good dispersion is achieved by aid of the double-loop circulation, and the created dispersion can be raised to the desired level without the drop size of the dispersion being essentially reduced.

Figure 2:
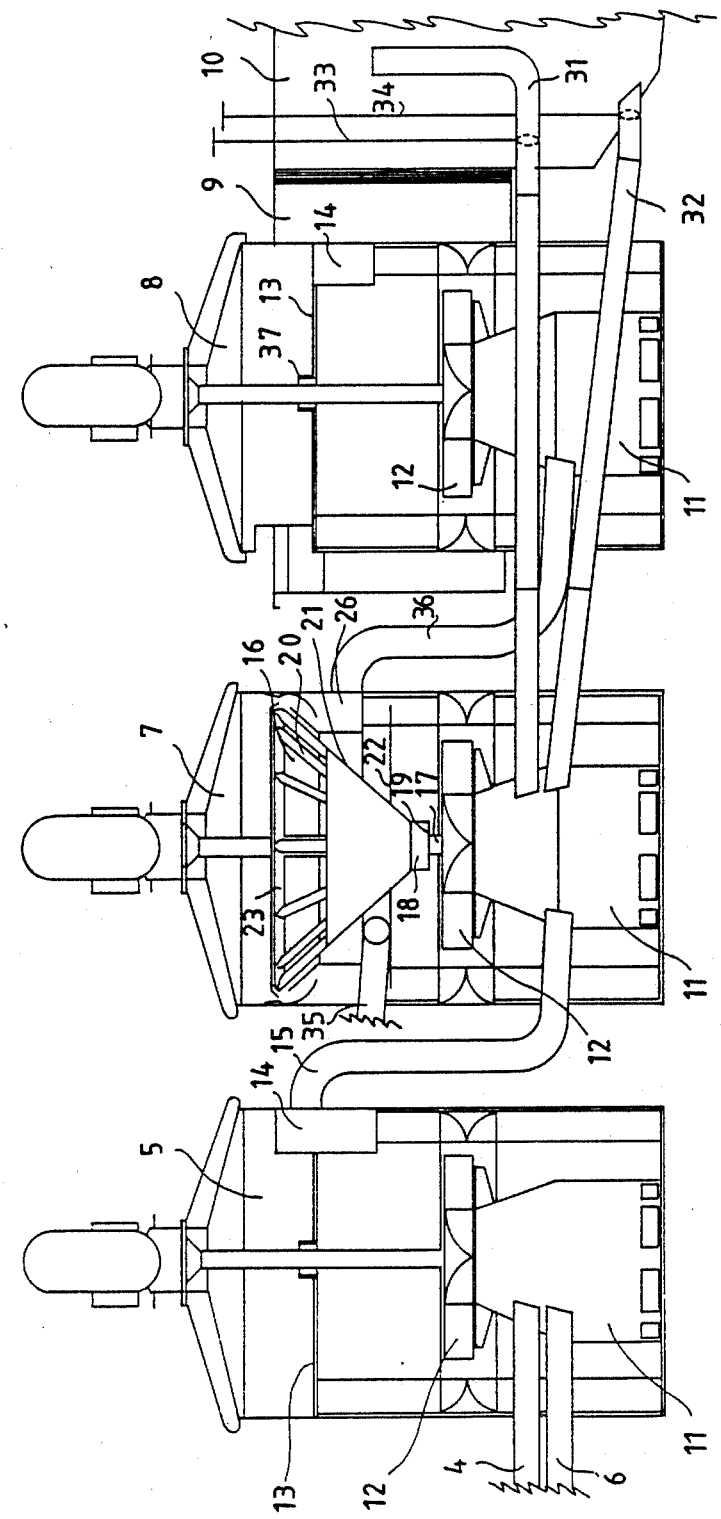
Figure 3:
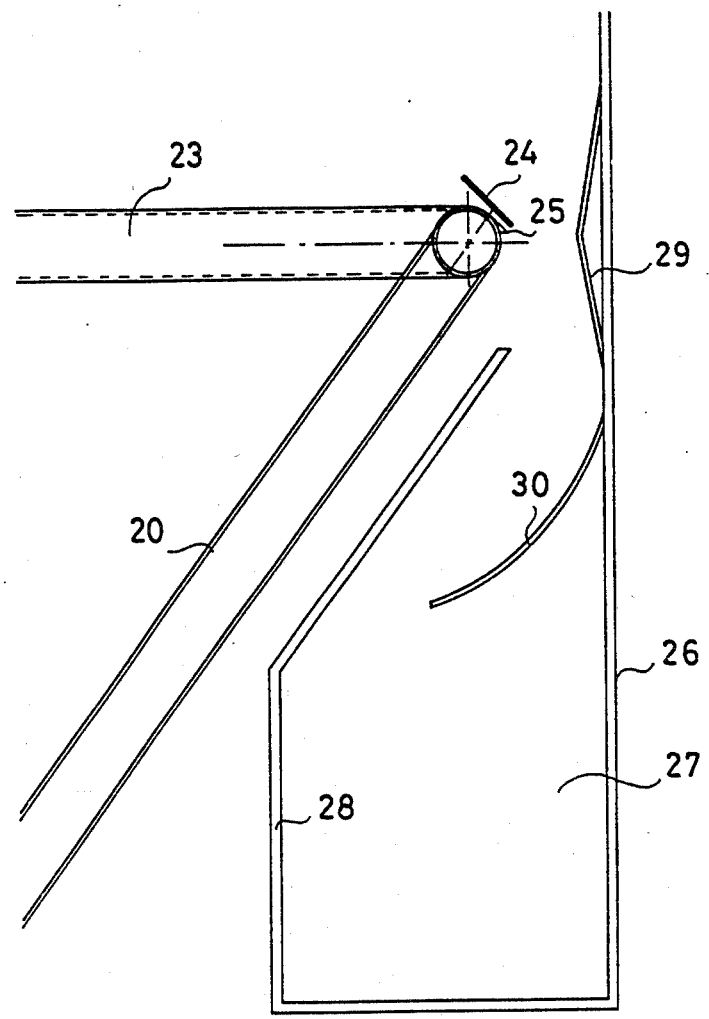
Figure 4:
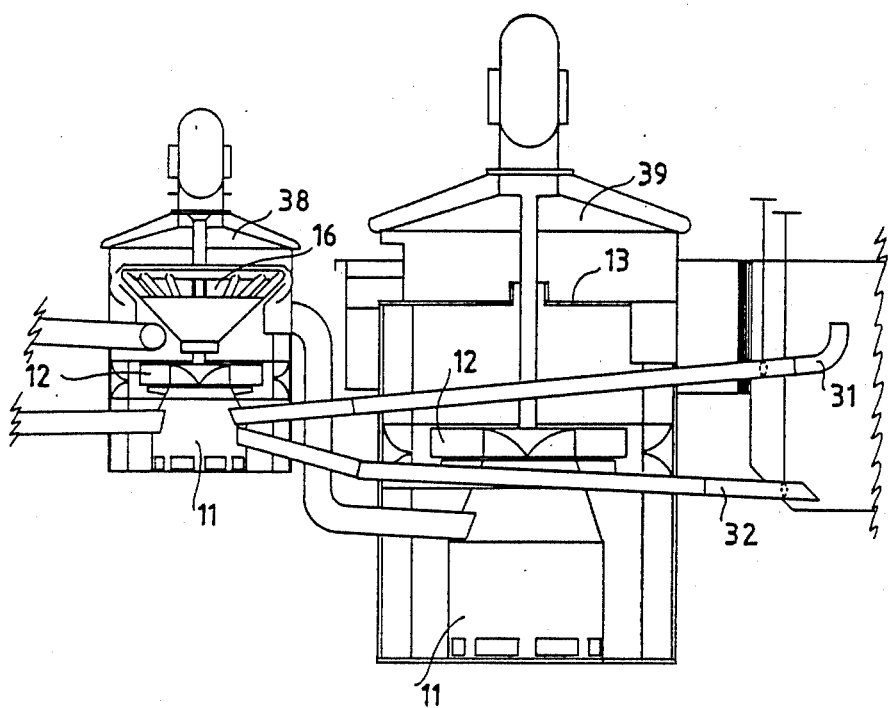

The invention is described in more detail with reference to the appended drawings, wherein FIG. 1 is a flow diagram of the extraction process of the invention, FIG. 2 is a cross-sectional illustration of the mixers in one extraction step, coupled in series, FIG. 3 is a cross-sectional illustration of the top part of a mixer comprising a dispersion pump, and FIG. 4 is a cross-sectional illustration of another advantageous way of coupling the mixers.

In FIG. 1, in the flow direction of the light solution phase, the first stages are the extraction steps I, II and III of the extraction stage A, then comes the washing step of stage B and two re-extraction steps of stage C. The flow path of the light phase is marked with a dotted line, and the flow path of the heavy phase is marked with an ordinary line. The light solution phase enters from the storage tank 1 into the separate premixer 2, where the chemical additions 3 are supplied in the extraction solution of the light phase. The major part of the premixed extraction solution 4 is conducted into the first mixer 5 of the first extraction step. The solution feed 6 of the heavy phase is also supplied into the same mixer, so that in this extraction step, the solutions flow in the concurrent direction. After the first mixer 5, the dispersion flows into the second mixer 7 and therefrom into the third mixer 8. From the third mixer 8 the dispersion flows into the presettler 9, and further into the settler 10. Into the second and third extraction step the light solution phase is controllably conducted from the premixer, whereas the heavy phase flows from the first extraction step into the second, and from the second into the third. In the second and third extraction steps, the number of mixers is only two, similarly as in the washing step B and in the re-extraction step C. In the re-extraction and washing steps, the acid heavy phase and the light phase both flow in the countercurrent direction. When observing the diagram it can be seen that an industrial-scale extraction process can be carried out by a number of extraction steps of less than before, if several mixers are installed in each extraction step according to the present invention.

FIG. 2 illustrates for instance the mixers of FIG. 1 and their couplings in more detail. The solution flow 4 of the light phase, and the feed 6 of the heavy phase, are conducted into the circulation cylinder 11 located at the bottom of the mixer, and more precisely into the conically narrowing top of the said cylinder. The dispersing is carried out by means of the turbine pump 12 located in the middle or top part of the mixer. The top part of the first mixer is provided with the horizontal baffle plate 13. In the mixer, roughly on the same level with the said horizontal baffle, there is fitted the vertical pipe 14, through which the dispersion is conducted, via the conduit 15, into the following mixer 7, and more precisely into the top part of the circulation cylinder 11 of the said mixer. The bottom edge of the vertical pipe 14 is roughly halfway between the turbine and the horizontal baffle plate.

The structure of the second mixer 7 differs from that of the first, because above the turbine 12, there is attached, coaxially with it, the dispersion pump 16. The dispersion jet discharged from the turbine is directed upwards, into the space limited by the dispersion pump and the outer walls of the mixer. Therefrom the dispersion flows downwards between the turbine sets, and from the bottom part of the mixer, via the circulation cylinder 11, upwards to below the turbine. By employing the efficient double-loop circulation thus created, the liquid contents of the whole mixer volume, including the top area, can be kept in a controlled dispersion. At the same time it is advantageous to supply the light solution with chemical additions from the premixer 2 into the dispersion jet which is directed vigorously upwards.

In order to make the mixer work, even with a high solution flow capacity, at a mixing intensity which is smoother and at the same time lower in average, the mixer is provided, in addition to the turbine 12, with a dispersion pump 16 which is installed in the top part of the mixer, on the same axis 17 with the turbine pump 12. The purpose of the dispersion pump is to raise the dispersion to a essentially higher level than the liquid surface in the mixer, because in the presettler 9 and in the settler 10, the liquid surface is also clearly above the liquid surface of the mixer 7. The dispersion pump 16 rotates at the same speed as the turbine pump. The suction inlet 19 of the suction cylinder 18 of the dispersion pump 16 is located fairly close to the turbine, above its middle but below the liquid surface. The rising pipes 20 belonging to the dispersion pump are seated in the suction cylinder, which is tightly closed at the top. The rising pipes are positioned so that they form an upwards widening cone, and the bottom parts of the rising pipes are surrounded, particularly below the liquid surface, by cone plates, among which the outer cone plate 21 is illustrated in the drawing. At their tops, the cone plates extend at least to the same level with the liquid surface 22 in the mixer. The cone plates rotate at the same speed as the rising pipes.

The ascending angle of the rising pipes is chosen according to the size of the apparatus and the speed of rotation; advantageously it ranges between 30°–60°. The number of the rising pipes is not critical and it can be freely chosen for instance between 2–24. The diameter of the rising pipes is chosen so that the flowing speed in the pipes remains relatively low, from 0.1 to 0.5 m/s. Within this area, the turbulence caused by the flowing is normally so slight that pumping does not reduce the size of the average drop.

The rising pipes 20 lead the dispersion directly into the circular pipe 23 which connects the rising pipes. The circular pipe serves as a centrifuge separating the solution phases, and within the circular pipe the flowing is attenuated because the sub-flows from the rising pipes partly collide. The dispersion is discharged from the circular pipe 23 via the horizontal slot which is located inside the circular pipe, at 20°–40° with respect to the highest point of the pipe. The horizontal slot does not necessarily have to be uniform, but instead of one uniform slot there may be several minor slots placed in the pipe area which remains in between the rising pipes.

From FIG. 3 it can be seen that in an inclined position above the circular pipe 23 there is installed the annular plate 24 which goes round the circular pipe and makes the dispersion discharged from the circular pipe to flow between the said annular plate 24 and the circular pipe. At the outer edge of the circular pipe 23 there is also fitted a downwards slanted treshold 25, the outer surface whereof is parallel to the annular plate. The purpose of the narrow treshold 25 is to make the dispersion flow become apart from the circular pipe. The annular plate 24 and the treshold are matched so that they direct the dispersion leaving the circular pipe downwards at an angle of roughly 45°.

From the circular pipe 23, the dispersion flows into the top chamber of the mixer, into the dispersion collecting trough 26 surrounding the said top chamber. The bottom surface of the collecting trough is clearly above the liquid surface 22 of the mixer. The outer surface 27 of the collecting trough also serves as the cylinder surface of the mixer. The inner surface 28 of the trough can be designed for example so that at the bottom it is parallel to the outer surface and at the top parallel to the rising pipes 20 of the dispersion pump. In addition to this, according to another advantageous application of the invention, there is formed a surface 29, inclined from the outer surface of the trough towards the inside in order to receive the dispersion, the bottom part of which surface 29 continues as an inwards curved braking surface 30. As was already stated above, a flexible and gentle treatment of the dispersion is important in order to avoid the danger of emulsification, and therefore the construction comprises the slanted surface 29 which the dispersion free of the circular pipe hits at a gentle angle. The braking surface 30 is used for slowing down the dispersion flow, because while flowing along this surface the dispersion is bound to proceed against the still effective centrifugal force. If the extraction reaction is slow, the braking surface may be omitted, and in that case the collecting trough functions as a continuation of the mixer, because while already in the trough, the dispersion is still in a whirling motion.

According to FIG. 2, the inner solution circulation in an extraction step is conducted from the settler 10 into the second mixer 7, i.e. via the light phase conduit 31 and the heavy phase conduit 32, into the top part of the circulation cylinder. The operations are controlled by means of the respective valves 33 and 34. By following this solution it can be secured that the desired phase is in dispersed state both in the second and the third mixer simultaneously, as the driving force for the extraction is maintained as high as possible in the first mixer. Thus the feed into the first mixer is not diluted by employing a settler circulation diluted with respect to the component to be extracted, but the settler circulations are directed into another mixer. FIG. 2 also shows the light phase feed 35 from another extraction step into the liquid surface of the second mixer. The heavy phase feed from the washing step is not illustrated in the drawing, but it is supplied into the circulation cylinder.

The heavy phase return conduit 32 coming from the settler of the same extraction step is always employed in the start-up situations. The heavy phase return connected to the operation of the dispersion pump secures that the double-loop circulation essential for the mixer operation is started. Differences in specific weights between the solutions may cause a situation where some of the light phase exists in the top part of the mixer and some of the heavy phase at the bottom, and the said incompletely mixed zones may function as obstacles preventing the mixer circulation from starting up. Thus the dispersion pump raises relatively more of the light phase into the settler, wherefrom part of the heavy phase returns along the return conduit into the mixer. After a short operation period, a sufficient amount of the heavy solution phase rises into the mixer turbine via the circulation cylinder, so that the double-loop circulation can be started. It is recommended that a slight heavy phase return is continuously kept going by aid of the valve 34.

From the collecting trough 26, the dispersion flows, along the conduit 36, into the third mixer. The third mixer is of the same type as the first; the top chamber of the mixer is provided with a horizontal baffle plate which is furnished with a collar 37 placed at the axis in order to prevent the dispersion from flowing back. On the opposite side of the mixer, with respect to the vertical pipe 14, there is located a sector opening (not included in the drawing), wherethrough the dispersion flows into the preliminary settler 9. Owing to this arrangement the dispersion is bound to flow over the whole horizontal baffle plate 13, and a partial classification of the phases takes place already at this stage. The horizontal baffle plate of the third mixer is on the same level as the surface of the dispersion in the collecting trough of the second mixer, or slightly below that. Therefore it is not necessary to pump the dispersion in the third mixer, and the rotating speed of the turbine of the third mixer can be further slowed down.

By installing, as in the above specification, three mixers according to the concurrent principle, the speed of the first turbine can be maintained higher than that of the second advantageously in such cases where an intensive extraction process brings about an anti-dispersion effect due to swift movements at the boundary surface. Respectively, it is advantageous to increase the speed of rotation if the extraction process requires a chemical addition which should be mixed thereinto as quickly as possible. All additions and circulations requiring dispersion efficiency are supplied into the first and second mixers, and therefore the speed of the turbine of the third mixer can be further slowed down with respect to the speed of the turbine of the second mixer, and yet the phases are kept in good dispersion.

In cases where the control over the type of dispersion is absolutely necessary in all mixers of the extraction step, the most advantageous practice is to provide the first mixer with a dispersion pump and the second and third mixer with a horizontal baffle plate. The return flows from the settler are conducted into the first mixer, where the correct phase, with respect to the situation, is kept in dispersion. The horizontal baffle plates of both the second and third mixer are placed advantageously on the same level as where the surface of the dispersion settles in the dispersion trough of the first mixer. The overflow treshold of the settler collecting trough is set on the same level or slightly lower than the horizontal baffle plates of the said mixers, so that the receptive capacity of the solutions in the extraction steps coupled according to the countercurrent principle would not be endangered.

In the second and third extraction step of the extraction stage illustrated in FIG. 1, as well as in the washing step and the re-extraction steps, there are employed two mixers per step. In these cases the first mixers are provided with a dispersion pump and the second mixers with a horizontal baffle plate. The internal circulations in a step are supplied into the first mixer, into the top part of the circulation cylinder. The light phase entering from the adjacent step, however, is supplied onto the liquid surface of the first mixer, where the solution enters at a free flow due to the lowering of the surface caused by the dispersion pump. Now the speed of the turbine in the second mixer can be dropped lower than could be possible if only one mixer were used. Also in this application, the dispersion is conducted from the collecting trough of the first mixers into the constricted part of the circulation cylinder of the next mixer, where, owing to the suction effect, the dispersion flow between the mixers is ensured even with low rotating speeds of the turbine.

The structure of FIG. 4 is advantageous especially while treating extensive and particularly emulsion-sensitive solution systems. According to the drawing the mixer part of the step comprises a small premixer 38 provided with a dispersion pump and a larger mixer 39 provided with a horizontal baffle plate. The required chemical additions are supplied into the premixer, and the return flows necessary for maintaining the desired type of dispersion are supplied from the settler of the same step. The solution flows entering from the adjacent extraction steps are directed as is described above: the heavy phase into the top part of the circulation cylinder, and the light phase into the liquid surface. Because the employed premixer is remarkably smaller than the main mixer, it is also possible to use lower tip speeds of the turbine, and the danger of emulsification which is connected to the dispersion of the solutions is decreased. A further important point is that after the predispersing, the dispersion in the main mixer can be maintained with a relatively low speed of the turbine.

We claim:

1. An apparatus for dispersing two phases in one step of an extraction process and for controlling the desired type of dispersion, comprising a presettler and a settler and a circulation cylinder installed in the bottom part of a mixing chamber and a turbine placed above the circulation cylinder, and including at least two mixers for carrying out an extraction step, at least one of the mixers being provided with a dispersion pump and with return conduits for the phases from a settler of said extraction step, said conduits being connected to said circulation cylinder; and wherein in order to control the type of dispersion and in order to create a double-loop circulation, to a top of the circulation cylinder there are connected both a heavy phase return conduit and a light phase conduit coming from the settler of the same extraction step, that above a pump of the turbine there is installed a dispersion pump coaxially with the turbine, a suction inlet of a suction cylinder of the said dispersion pump being located above the middle of the turbine, that in the suction cylinder which is closed at the top, there are seated at least two rising pipes which form an upwards widening cone, that around the rising pipes there are fitted cone plates which at the bottom extend to below a liquid surface in said mixing chamber and at the top at least to the same level with said liquid surface, that the rising pipes end up to a connecting circular pipe wherefrom the dispersion flow is directed into a next stage through a collecting trough placed above the liquid surface.

2. The apparatus of claim 1 wherein the mixers are coupled in series.

3. The apparatus of claim 1, wherein a first mixer is essentially smaller in size than any further mixer, said first mixer having a dispersion pump.

4. The apparatus of claim 1 wherein a rotational speed of the turbine in the mixers is slowed down in a flow direction of said dispersion.

5. The apparatus of claim 1, wherein the circular pipe is provided with at least one horizontal slot which is placed on the inside of the circular pipe, 20°–40° from a highest point of the pipe.

6. The apparatus of claim 1, wherein a downwards inclined, narrow threshold is fitted at the outer edge of the circular pipe.

7. The apparatus of claim 1, wherein above the circular pipe there is placed an annular plate in a slanted position.

8. The apparatus of claim 1 wherein from an outer surface of the collecting trough there is formed an inclined surface which is directed inwards.

9. The apparatus of claim 8 wherein a bottom part of the inclined surface continues as an inwards curved braking surface.

10. The apparatus of claim 1, wherein the number of rising pipes is between 2-24.

11. A method for dispersing together a heavy liquid phase and a light liquid phase in two mixing stages of one extraction step by causing both said phases to flow in the same direction through said two mixing stages and including creating an intensified liquid circulation in at least one of said mixing stages and causing the dispersion to rise to a vertically higher level than a liquid surface level in a mixing chamber in which said mixing is carried out, said method further including directing mainly upwards a dispersion jet discharged from a mixing member located no lower than a middle part of said mixing chamber; causing the dispersion to flow downwards at outer edges of said mixing chamber; causing said downwards flow of dispersion to turn at a bottom part of said mixing chamber and thence causing the dispersion to flow upwards through a separate part of said mixing chamber; selecting a phase for said return flow from the settler and causing said return flow of said selected phase to return to the mixing chamber; and discharging the dispersion from said mixing chamber as at least two rotating sub-flows rise to a level higher than the liquid level in said mixing chamber; then turning the dispersion to a direction tangential to the direction of rotation of said sub-flows, whereby centrifugal force causes partial classification of said phases; and conducting the dispersion away as a thin layer.

12. The method of claim 11 wherein the phase selected for said return flow is the heavy phase and including using said return flow to create said double-loop circulation at start-up of said dispersing.

13. The method of claim 11 and comprising continuously supplying a return flow of a heavy phase from said settler to said mixing chamber.

14. The method of claim 11 and including dividing the dispersion into from two to twenty-four sub-flows.

15. The method of claim 11 wherein said dispersion in said sub-flows has a flow speed between about 0.1 and about 0.5 meters per second.

* * * * *

UNITED STATES PATENT AND TRADEMARK OFFICE
CERTIFICATE OF CORRECTION

PATENT NO. : 4,786,187
DATED : November 22, 1988
INVENTOR(S) : Bror G. Nyman et al It is certified that error appears in the above-identified patent and that said Letters Patent is hereby corrected as shown below:

Column 3, line 54,

"turbine sets" should read: --turbine jets--.

Column 7, line 52,

"20°-40° from a" should read: --at 20°-40° from a--.

Signed and Sealed this

Eighteenth Day of April, 1989

Attest:

*Attesting Officer*

DONALD J. QUIGG

*Commissioner of Patents and Trademarks*